Patented Sept. 20, 1932

1,877,856

UNITED STATES PATENT OFFICE

MAX HAGEDORN AND ERICH ROSSBACH, OF DESSAU IN ANHALT, GERMANY, ASSIGNORS TO I. G. FARBENINDUSTRIE AKTIENGESELLSCHAFT, OF FRANKFORT-ON-THE-MAIN, GERMANY

MANUFACTURE OF MIXED CELLULOSE ETHERS

No Drawing. Application filed January 22, 1930, Serial No. 422,673, and in Germany February 25, 1929.

Our present invention relates to a new process of manufacturing mixed cellulose ethers and more particularly to those which contain in the cellulose molecule a hydroxyalkyl residue.

Another object of our invention are the mixed ethers obtainable by our process.

The whole crux of our invention can well be exemplified by brief discussion of the prior art. Simple and mixed ethers of cellulose have been prepared by reacting alkali cellulose with one or several alkyl halides. This process has the disadvantage that the reaction especially with the higher alkyl halides requires a high temperature, a high concentration of alkali and a long time; unless these particular conditions are observed, fibrous, not uniform ethers of bad properties of solubility and of small technical value are obtained.

According to our present invention the etherification of alkali cellulose by means of alkyl halides is considerably accelerated by addition of ethylene oxide or a homologue thereof, so that an essential shortening of the duration of reaction and a lowering of the reaction temperature is possible. The reaction is already accelerated by a fraction of 1 mol. of ethylene oxide calculated upon 1 mol. of cellulose. However, we may use greater quantities of an alkylene oxide, whereat the same good results are obtained.

When using an etherification mixture containing besides an alkyl halide also an ethylene oxide, mixed ethers are formed, the radicle of alkylene oxide likewise entering the cellulose molecule. The alkylene oxide added not only acts as an accelerator in the reaction between the alkali cellulose and the alkyl halide, but participitates in the etherification by entering the cellulose molecule. Thus mixed cellulose ethers containing a hydroxyalkyl residue are obtainable in one operation.

For our new process are suitable all kinds of cellulose and its transformation products and all processes of preparing alkali cellulose known in the art.

As an etherifying agent we may use any simple or substituted, saturated or unsaturated alkyl halide, as for instance methyl chloride, ethyl chloride, propyl chloride, butyl chloride and so on, or benzyl chloride and similar products. As accelerator for the reaction and as second etherifying component we may use ethylene oxide itself or all compounds containing the ethylene oxide ring. The reaction may be carried out in the presence of a diluent, for instance, of chlorobenzene; for the further acceleration of the etherification process we may add other catalysts, as for instance dimethylaniline.

Since our process is carried out under very mild conditions on account of the presence of ethylene oxide, the cellulose molecule is greatly spared and films and other artificial products prepared from our mixed ethers are distinguished by outstanding mechanical properties. This manifests itself particularly by the breaking tension test and folding test. The mixed hydroxyalkyl ethers obtainable according to our process may be worked up either alone or mixed with additional products known in the art dealing with cellulose derivatives, such as for instance, softening agents, filling materials, other cellulose derivatives, coloring matters or the like. Films, threads, lacquers, coatings, varnishes, impregnating solutions, plastic masses, or the like products manufactured of ethers, prepared according to our invention, have an excellent quality.

The following examples illustrate the invention:—

*Example 1.*—1 mol of alkali cellulose is mixed with 6 mol of benzyl chloride and 1 mol of ethylene oxide in an autoclave heated to 50° C. The reaction heat evolved raises the temperature of the mixture to about 120° C.

After the main reaction is complete the mixture is again heated and kept for 2 to 3 hours at a temperature of somewhat above 100° C. As soon as a mass free of fibers has formed, it is cooled, kneaded with ethanol and extracted. The excess of benzyl chloride is removed and the mass is washed with water, in order to dissolve the sodium chloride formed during the reaction and an excess of alkali. The resultant benzylhydroxyethyl cellulose is soluble in chloroform, diethylenedioxide and benzene, insoluble in benzine, ethanol, methanol and ether.

Example 2.—1 mol of alkali cellulose is treated with 6 mol of benzyl chloride and 1½ mol of butylene oxide as indicated in the preceding example. A benzylhydroxybutyl cellulose is obtained which is soluble as indicated in Example 1.

Example 3.—1 mol of alkali cellulose is heated in an autoclave to 50° C. together with 3 mol of ethylene oxide and 20 mol of propyl chloride; the reaction heat evolved raises the temperature of the mixture to about 120° C. After 6 to 7 hours a fiberless mass is formed which is heated on the water bath in order to recover the excess of propyl chloride. After the sodium chloride formed during the reaction and the excess of alkali have been removed by means of water, the reaction product is dried. Propylhydroxethyl cellulose is obtained which is soluble in benzene.

It is obvious that our invention is not limited to the examples or to the details given therein. As mentioned above, we may add to the reacting mixture a diluent, as for instance, chlorobenzene or another catalyst, such as dimethylaniline.

What we claim is:—

1. The process which comprises reacting upon alkali cellulose with an alkyl halide in the presence of an unsubstituted alkalene oxide.

2. The process which comprises reacting upon alkali cellulose with an alkyl halide in the presence of an unsubstituted alkaline oxide and of a diluent.

3. The process which comprises reacting upon alkali cellulose with an alkyl halide in the presence of an unsubstituted alkylene oxide, of a diluent and of a further catalyst.

4. A mixed cellulose ether containing in its molecule a hydroxyalkyl radical and being soluble in chloroform, diethylenedioxide and benzene, and insoluble in benzine, methanol, ethanol and ether.

5. The process which comprises mixing 1 mol of alkali cellulose with 6 mols of benzylchloride and 1 mol of ethylene oxide, heating the mixture to 50° C. in a closed vessel, allowing the mixture to react and finishing the reaction by heating the mixture for two or three hours at a temperature above 100° C.

6. The process which comprises mixing 1 mol of alkali cellulose with 6 mols of benzylchloride and 1½ mols of butylene oxide, heating the mixture to 50° C. in a closed vessel, allowing the mixture to react and finishing the reaction by heating the mixture for two or three hours at a temperature above 100° C.

7. The process which comprises heating a mixture consisting of 1 mol of alkali cellulose, 3 mols of ethylene oxide and 20 mols of propyl chloride in a closed vessel to 50° C., allowing the mixture to react for 6 to 7 hours while heating the mixture on a water bath.

In testimony whereof, we affix our signatures.

MAX HAGEDORN.
ERICH ROSSBACH.